Jan. 23, 1968  C. M. MULLIS ET AL  3,365,051
MOVING WALK
Filed June 25, 1964  5 Sheets-Sheet 1

INVENTORS
Clyde M. Mullis and
Larry P. Tosato.
BY C. L. Freedman
ATTORNEY

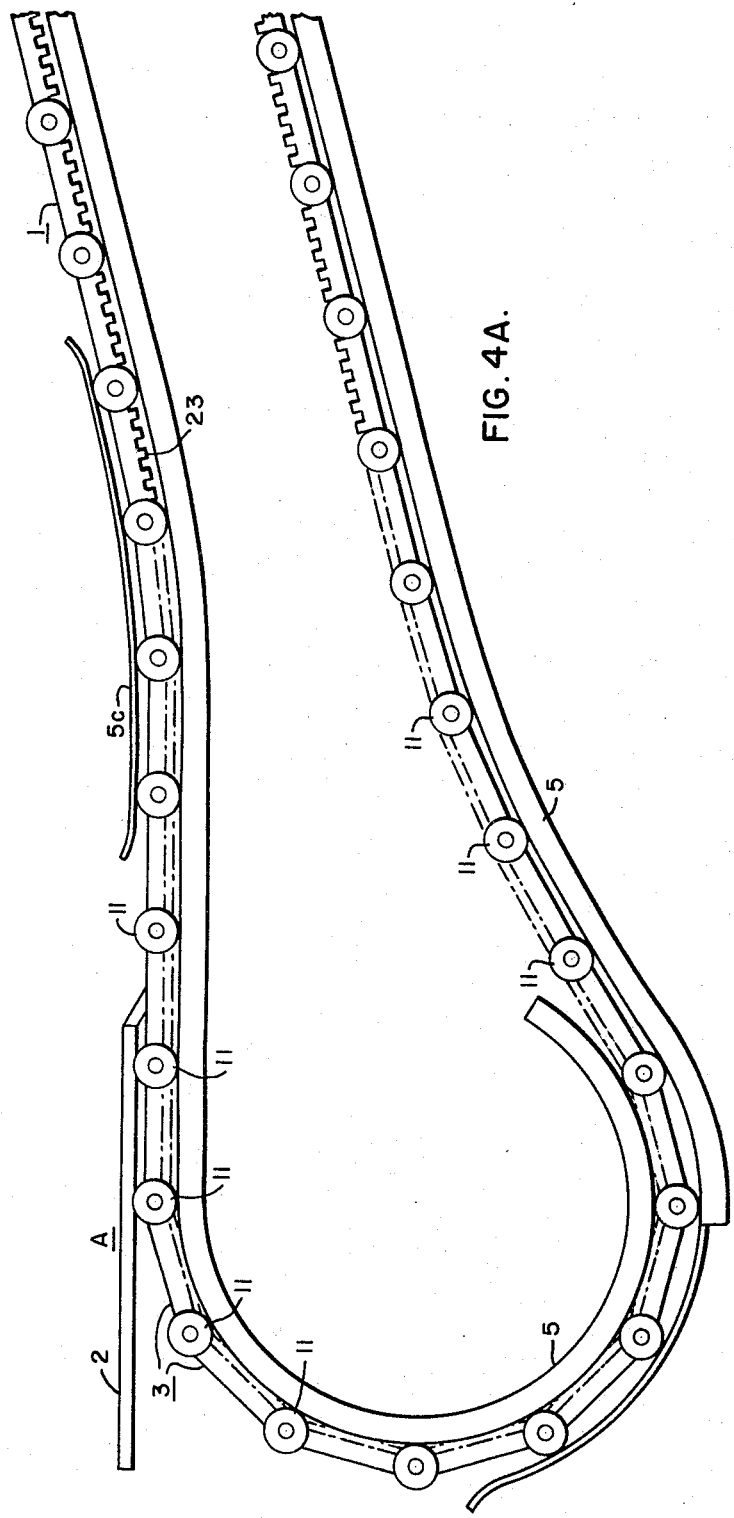

United States Patent Office 3,365,051
Patented Jan. 23, 1968

3,365,051
MOVING WALK
Clyde M. Mullis, Glen Rock, and Larry P. Tosato, Millburn, N.J., assignors to Westinghouse Electric Corporation, East Pittsburgh, Pa., a corporation of Pennsylvania
Filed June 25, 1964, Ser. No. 377,854
4 Claims. (Cl. 198—137)

ABSTRACT OF THE DISCLOSURE

This invention relates to moving walks and it has particular relation to moving-walk belts. A moving walk may employ a continuous moving belt for conveying passengers from a first to a second landing. While the belt may be continuous and constructed of an elastomer such as rubber, it may conveniently be articulated, i.e. constructed of an endless series of rigid segments or platforms. In this application such platforms will hereafter be referred to by the word "pallets."

---

One example of such a moving-walk belt is described in application Ser. No. 200,499 to L. R. Rissler and Clyde M. Mullis filed on or about June 6, 1962, now Patent 3,191,743.

A moving walk such as described in the Rissler and Mullis application may comprise a moving walk belt having an endless series of similar pallets and is so constructed that the trajectory of the belt may follow a course whose load-transporting run includes any desired combination of horizontal and inclined portions. In a preferred embodiment of the invention each of the pallets is substantially rectangular in shape and adjacent pallets are supported in common by a pair of rollers disposed for rotation about a common axis extending transversely to the direction of movement of the belt. Suitable guides in the form of tracks are provided for the rollers in order to move the belt in the desired path.

The paths tracked by the individual pallets of such a walk belt generally consist of an upper straight limb and a lower similar limb interconnected by a semicircular loop at each end, and in the Rissler and Mullis application the tracks on which the rollers run have similar upper and lower straight limbs interconnected at each end by semicircular portions. It is found however that since the pallets form chords of these semicircles as they traverse the end turns, this "chord effect" causes slight but perceptible pulsations or jerks in the movement of the walk belt. Similar pulsations occur in the movement of moving stairways. The present invention relates to arrangements for minimizing and eliminating such pulsations. It is accordingly an object of the invention to provide an improved moving sidewalk or stairway having an articulated load-transporting belt which comprises an endless series of similar pallets which are moved with a velocity free from pulsations or jerks perceptible to the user.

It is another object of the invention to provide a moving-walk belt or moving stairway belt with a new and improved support arrangement.

It is still another object of the invention to provide a moving-walk belt or moving stairway stairway belt with a new and improved arrangement for imparting movement to it in the course of its operation.

It is still another object of the invention to provide a moving-walk belt or moving stairway belt with a new and simplified track structure for supporting it in its movement.

Still another object of the invention is to provide a moving-walk belt or a moving stairway belt with a new and improved driving system for imparting a movement to the belt which shall be free from perceptible pulsations and jerkiness.

Other objects of the invention will be apparent from the following description taken in conjunction with the accompanying drawings in which:

FIGURE 1 is a view in side elevation of a moving-sidewalk belt and certain of the supports therefor in accordance with one species of the invention. The particular type illustrated in FIG. 1 is of a moving sidewalk belt operating between landings at different levels. Much of the supporting structure for the runways on which the belt is constrained to travel are omitted for the purpose of simplifying the drawings and making the arrangement clearer.

FIG. 4A is a view in elevation to en enlarged scale of the lower end of the moving-walk belt in accordance with a second modification of the invention showing certain details of the supporting structure.

Figure 1:
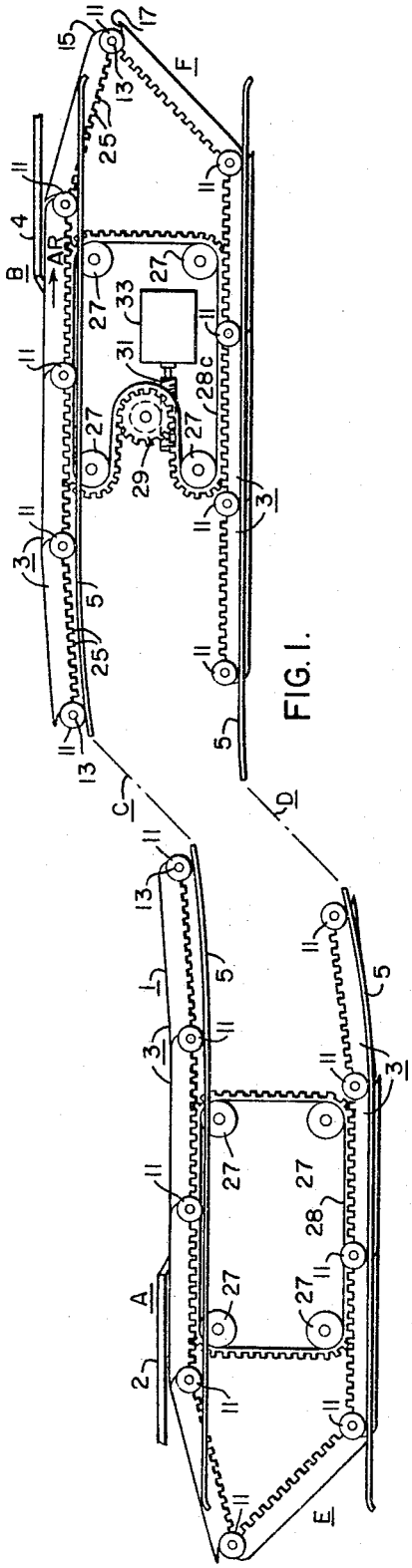
Figure 3:
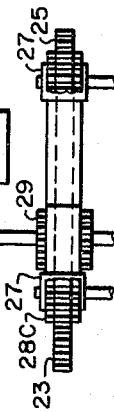
FIG. 3 is a similar plan view showing the driving belts for the moving walk of the FIG. 1 species adjacent the upper landing.
Figure 2:
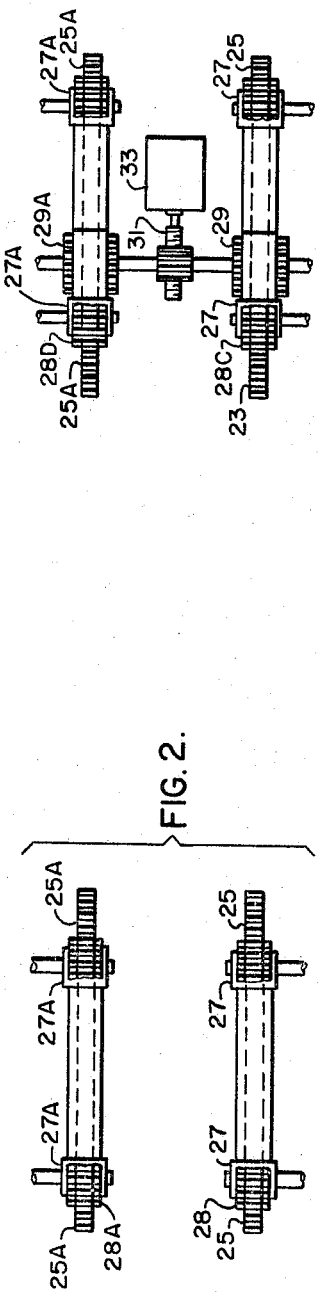
FIG. 2 is a view in plan showing the arrangement of the driving belts for the moving walk of the FIG. 1 species of the invention at the lower landing.

Referring to FIGS. 1 to 3 of the drawings, illustrated therein is a moving sidewalk which includes a continuous articulated belt 1 comprising an endless series of similar generally rectangular pallets 3 disposed to be moved along guides or tracks 5 and 5A which may be supported by a suitable truss not shown. The tracks 5 and 5A together with associated components are employed respectively for guiding the two sides of the belt 1 in a similar manner for this reason each component associated with the track 5A will be designated by the reference character for the similar component associated with the track 5 plus a suffix "A." The belt 1 has an upper or passenger load-transporting run C extending between a lower landing 2 and an upper landing 4 which each overlaps the nearer portion of the upper run. The passenger or load-transporting run comprises a lower horizontal portion A adjacent to the lower landing and an upper horizontal portion B adjacent the upper landing, and the portion C which joins the horizontal portions and which may be inclined at an angle relative to the horizontal of the order of 15°. The belt 1 also has a lower or return run D and a pair of runs at the ends E and F, the runs at E and F constituting transitions between the load-transporting and return runs.

Figure 6:
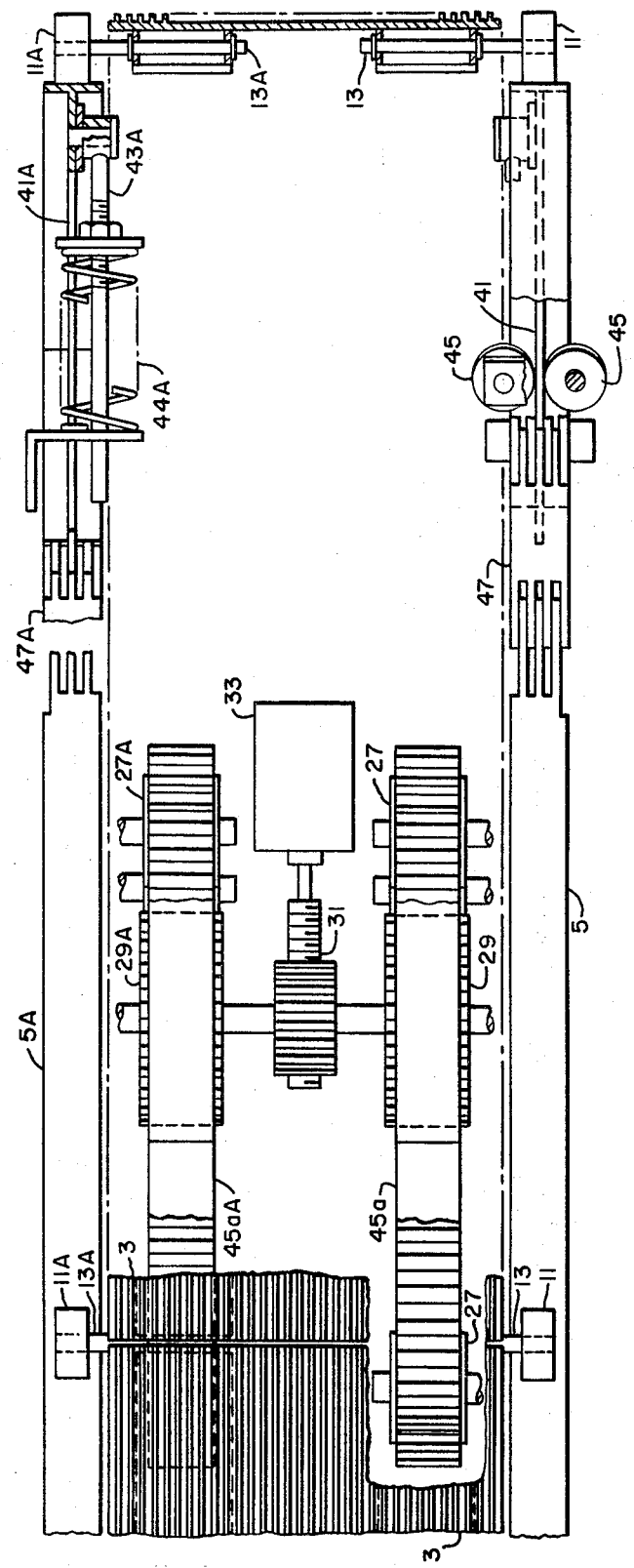
FIG. 6 is a view in plan of the same portion of the FIG. 4B track way which is partially cut away at places, and illustrates an alternative arrangement of the track ways and the belt driving gearing.

Referring principally to FIGS. 1 and 6 for details of construction of the pallet 3, adjacent pallets are supported in common by a pair of outwardly disposed wheels or rollers 11 and 11A which are mounted for rotation about a common axis by means of a pair of longitudinally aligned stub axles 13 and 13A. The rollers 11 in turn are supported by the tracks 5 for guiding the pallets 3 in the desired path.

The adjacent end portions 15 and 17 of each pair of adjacent pallets 3 have cylindrical surfaces which are curved about the axis of rotation of the pair of rollers 11 associated in common therewith. The length of the end portions of the respective pallets is such that the end portion 17 overlaps the end portion 15 of the adjacent pallet, as viewed from above, during traverse of the platform through the transporting run of the belt 1 between the landings. This overlapping construction is discussed more fully in the aforesaid Rissler et al. application.

This construction will be seen to result in preventing any foreign substance from entering and falling through the space between adjacent pallets.

It will be appreciated that the foregoing association of the pallets 3, the axles 13 and rollers 11 permit the pallets to follow precisely the desired course as determined by the tracks 5. In order to prevent the rollers and their respective associated pallets from rising from the tracks 5 during the transition of the belt 1 between its load-transporting run lower horizontal portion A and its inclined portion C, a relatively short auxiliary upper track section 5C, as illustrated in FIG. 4A, is provided at each side of the belt adjacent the aforesaid transition.

The ends of the tracks 5 overlap the positions of the upper and lower landings 2 and 4, and their ends are, as shown, in FIG. 1, slightly curved downwardly. The vertical distance between the tracks 5 at the landings 2 and 4 is made equal to a multiple of one length of the pallets 3. As is clearly shown in FIG. 1, this arrangement permits the pallet nearest the end F of the upper track 5, when moving in the direction of the arrow AR, to permit its roller 11 to run off the end of the track 5 and start dropping toward the lower track 5. As a result the pallet may transfer itself with the roller 11 hanging free in air from the upper track 5 to the lower track 5, and then start traversing, in the return run, the lower track 5 toward the other landing.

In a similar manner, one of the rollers 11 between the two pallets nearest the end E of the tracks may leave the lower track 5 and move upwardly until it passes onto the adjacent end of the upper track 5 thereby transferring the two pallets 3 adjacent that roller from the lower track 5 to the load-transporting run. By this arrangement the rollers 11 pass along the load-transporting run to its end then move freely, and unsupported except by the pallets, through the air to the return run along the lower track 5; move along it to its opposite end and again hang free in air, supported only by the pallets 3, until they have started their return run along the load-transporting run on upper track 5. On its non-load-bearing surface each of the pallets is provided with a pair of spaced racks 25 and 25A extending in the direction of travel of the pallets as described in the aforesaid Rissler et al. application. To insure that the load-transporting upper run of the moving platform belt and its lower run shall move at oppositely directed but equal speeds, the racks at the end A of the belt are interlinked as shown in FIG. 1 by a gearing arrangement comprising flexible belts 28 and 28A carrying a toothed periphery adapted to mesh with the racks 25 and 25A respectively on the pallets 3, each belt 28 or 28A being supported to cover the periphery of a rectangle having four rollers 27 or 27A at its corners. The rollers 27 are mere idlers. This arrangement will be seen to insure that the pallets 3 on the upper run of the belt move from left to right at speed identical to that with which the pallets on the lower run of the belt directly below move from right to left. FIG. 2 shows a plan view of the interlinkage just described, the portion of the interlinking belt between the upper rollers 27 being shown cutaway for the sake of clarity.

Somewhat similar interlinking belts 28C and 28D are shown adjacent the end B of the moving walk, but the interlinking belt is made to cover half the circumference of toothed pulleys 29 and 29A which are driven continually by a worm-gear 31 driven by an electric motor 33 at the necessary speed to cause the upper and lower runs of the pallet 3 to move in opposite directions with the desired velocity.

FIG. 3 is a plan view of the arrangement of the interlinking toothed belt just described. The upper portion between the upper rollers 27 of the interlinking belt being broken off for the sake of clarity in showing.

It will be readily understood that the flexible driving belts at the end A may be provided with a drive-motor and worm-gear when desired, as for example, in the case where the length from landing 2 to landing 4 is great enough.

FIGS. 4A through 6 show an alternative method to that just described in connection with FIGS. 1 to 3 of supporting the moving-walk belt at the end sections or loops where it transfers between the upper load-transporting run and the lower or return run in its course of travel. At the end A the landing 2 adjacent the lower end of the moving walk projects well over the curved portion of the run where the walk changes from its return path to its load-transporting run for the assumed direction of travel, and the track 5 on which the rollers 11 travel is curved to cause the moving walk to follow a desired course. The curved lower portion of the track 5 overlaps the track 5 upper portion at the end of the travel of the rollers in the return run of the belt.

Figure 4B:
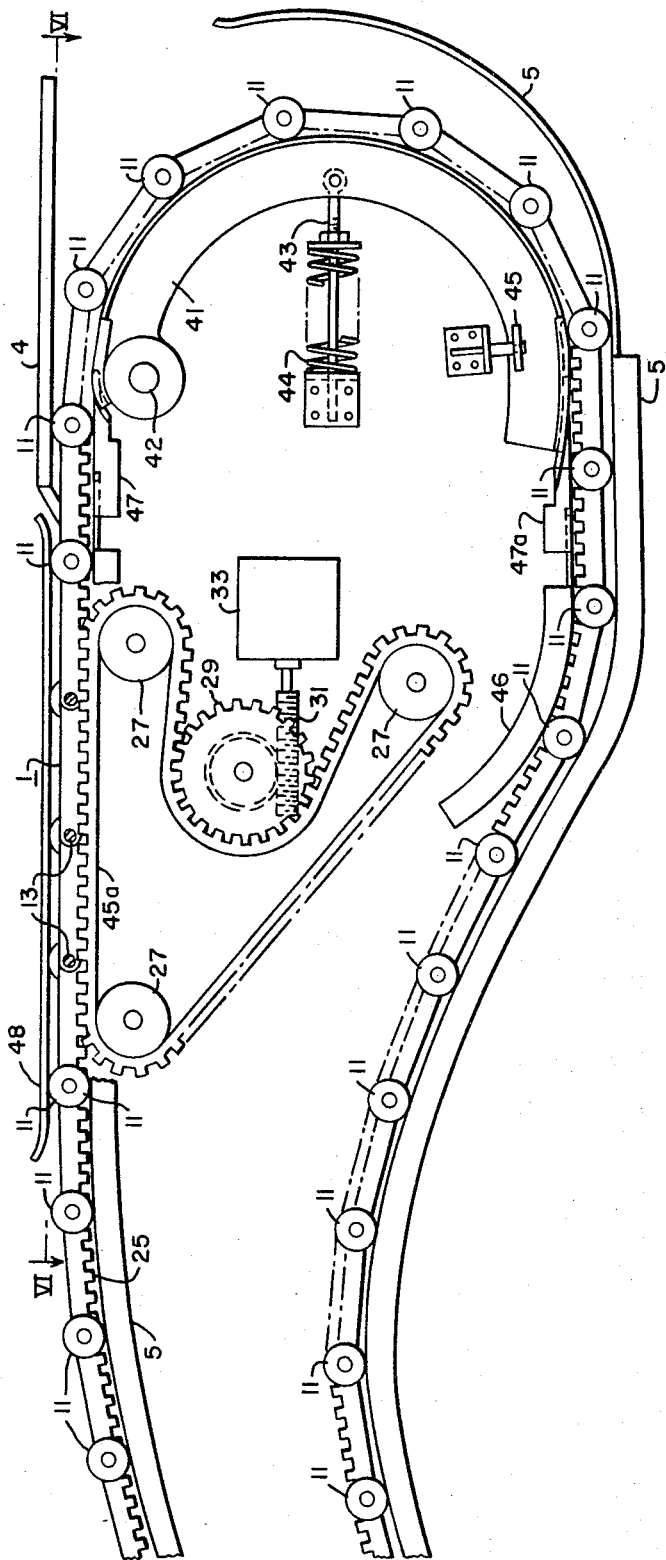
FIG. 4B is a similar elevational view in an enlarged scale of the moving-walk belt, and parts of its supporting structure, adjacent the upper landing of the second modification of the invention and shows in detail the driving motor and gearing for the moving belt, and also an alternative method of supporting the moving-walk belt adjacent the upper landing.

FIG. 4B shows the structure of the present modification in the vicinity of the upper end B of the moving-walk 1. The upper landing 4 projects over the curved portion of the path where the belt moves from the load-transporting run to the return run. The portion of the track for the rollers to traverse comprises an approximately semicircular section 41 hinged at its upper end to a pivot 42 in the supporting-truss for the walk-structure. The sector 41 is biased in a counterclockwise direction about the pivot 42 by a link 43 and a spiral spring 44. By this means the moving-walk belt 1 is maintained under tension. Freely turning rollers 45 press against the opposite sides of the sector 41 and maintain it safely in vertical alignment. The free end of the sector 41 projects over the right-hand end of the track 5 for the return run of the rollers. This end of the track 5 has a flexible projection curved around upward to shield the end of the curve path of the moving-walk belt.

Figure 5:
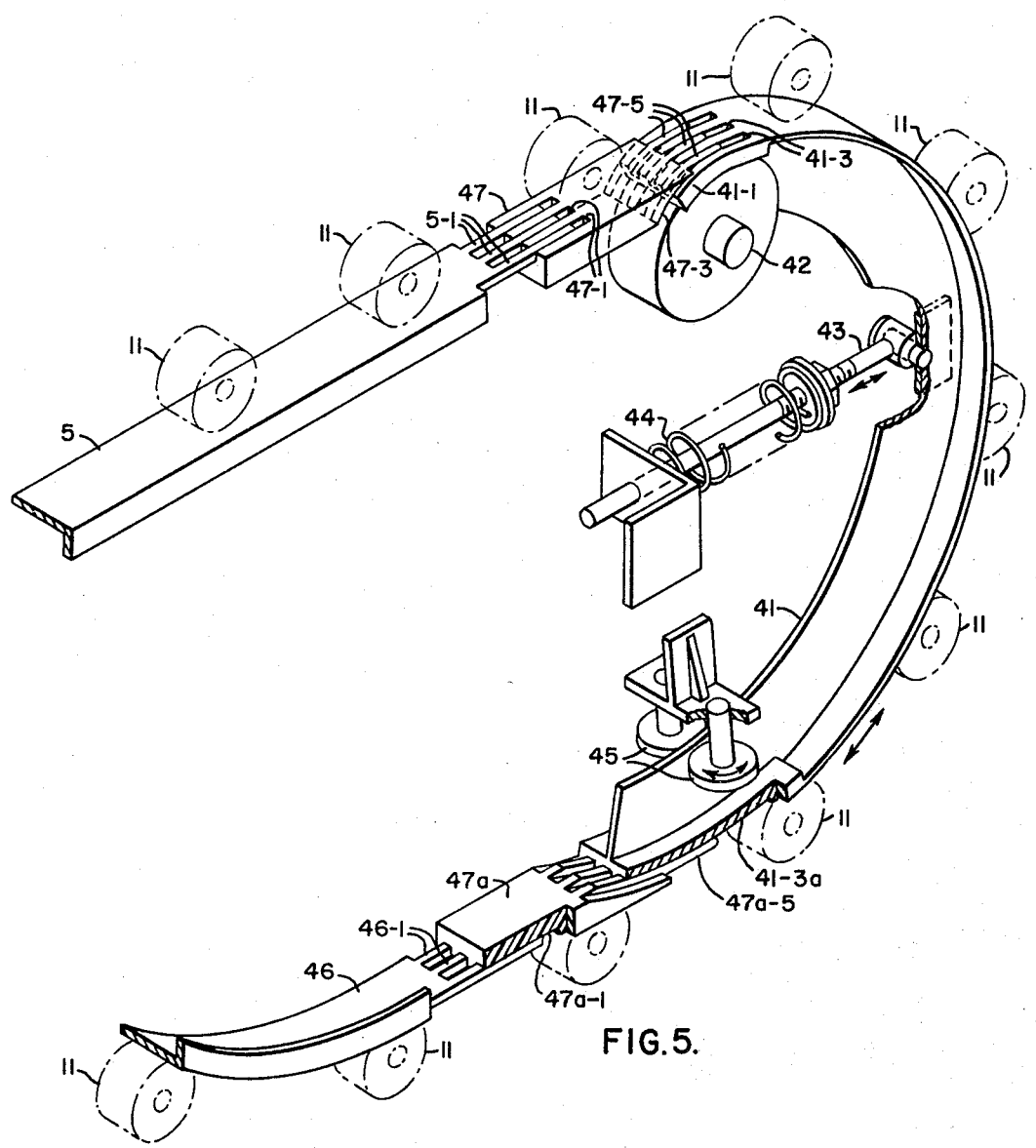
FIG. 5 is a view in perspective of a portion of the tracks adjacent the upper end of the moving walk showing in an enlarged detail a certain arrangement needed to take care of the movement of the end portion of the track in the FIG. 4B modification of the invention.

FIG. 5 shows a view in perspective of the sector 41, pivot 42, link 43, spring 44 and rollers 45 just described.

The moving-walk belt 1 has its pallets 3 interconnected by hinge-rollers 11, and each pallet has its underside provided with toothed racks 25 and 25A similarly to the above description of FIG. 1. The movement of the pallets 3 in the modification of FIG. 4A through FIG. 6 of the invention is provided for by flexible belts 45a and 45aA having teeth on their external faces which mesh with the racks 25 and 25A respectively, but this drive is provided only adjacent the end B of the moving walk and the teeth of flexible belts 45a and 45b engage only the pallets on their upper load-transporting run. Each flexible drive belt is supported by one pair of idler pulleys 27 which hold it in engaging position with the racks 25 or 25A, a third idler being provided below the level of the first pair, and each drive belt 45a or 45b also embraces and meshes with a toothed pulley 29 or 29A driven by a worm-gear 31 and a drive-motor 33 similar to that described in connection with FIG. 1.

Since the sector 41 is able to turn through a slight angle about the pivot 42, there must at times be a slight gap between its upper end and the right-hand end of the track 5 on which the rollers are carried. At such times there would be a noticeable jolt or jerk in the travel of the rollers 11 with resultant noise were nothing provided to overcome this tendency.

To insure that the rollers 11 are kept at all times in contact with the lower right-hand part of the track 5 for the return run an auxiliary track 46 is provided. Because of the movement of the end of sector 41 as it rotates slightly about the pivot 42 means preferably are provided to prevent a jerk in the rollers as they move from the sector 41 to the auxiliary portion 46.

To prevent these jerks and discontinuities at the opposite ends of the sector 41, a member 47 is provided between the upper end of the sector 41 and the adjacent end of the track 5. The member 47 has a surface for guiding the rollers 11 which forms a continuation of the roller engaging surface of the track 5.

By inspection of FIG. 5, it will be noted that the end of the track 5 has a plurality of spaced fingers 5–1 projecting therefrom in the direction of travel of the rollers 11. The member 47 has a plurality of grooves 47–1 in its upper surface for snugly and slidably receiving the fingers 5–1. The fingers 5–1 rest on, and are supported by the surfaces of the member 47 forming the bottoms of the the grooves.

In order to eliminate any gap between the member 47 and the sector 41, the lower surface 47–3 of the member 47 adjacent the sector 41 and the adjacent upper surface 41–1 of the sector are concentric about the axis of the pivot 42 with the surface 47–3 overlapping, and slidable relative to the surface 41–1. The member 47 has spaced fingers 47–5 projecting therefrom in the direction of travel of the rollers 11 and these fingers are snugly and slidably received in grooves 41–3 formed in the surfaces 41–1. The grooves 41–3 have bottom surfaces concentric with the axis of the pivot 42, these bottom surfaces slidably receiving and supporting the fingers 47–5.

The upper surfaces of the fingers 47–5 are substanitally tangent to the surface 41–1. Thus by securing the member 47 to the supporting truss of the moving-walk a smooth path is established between the track 5 and the sector 41 over the member 47 throughout the range of movement of the sector 41 as the rollers pass thereover.

A member 47a similarly is interposed between the lower end of the sector 41 and the adjacent end of the auxiliary track 46. The track 46 has spaced fingers 46–1 projecting towards the member 47a for snug and slidable reception in grooves 47a–1. The member 47a has a surface slidably overlapping the adjacent surface of the sector 41, both of these surfaces being concentric about the axis of the pivot 42. Spaced fingers 47a–5 project from the member 47a towards the adjacent end of the sector 41 for snug and slidable reception in grooves 41–3a provided in such adjacent end. The surfaces of the fingers 47a–5 on which the rollers ride are tangent to the corresponding adjacent surface of the sector 41.

Auxiliary guides 48 are provided to hold the rollers 11 down so that the teeth of the racks 25 and 25a make solid engagement with the toothed belts driven by pulleys 29 and 29A.

FIG. 6 is a section taken along the line VI—VI in FIG. 4B. In FIG. 6 the drive belts 45a and 45aA over the idlers 27 are shown broken away in parts of their upper runs to permit a clearer showing of the drive pulleys 29 and 29A.

In the embodiment of FIGS. 4A–6 the drive belts 45a and 45aA assure a smooth and uniform travel of the load-transporting run of the belt 1. The "chord effects" of the belt are absorbed by movements of the sector 41.

Although the invention has been described with reference to certain specific embodiments thereof, numerous modifications falling within the spirit and scope of the claims are possible.

We claim as our invention:

1. A conveyor for carrying a load, comprising a structure having first and second spaced landings between which load is to be conveyed, an articulated belt comprising an endless series of pallets hinged together on axes normal to the line between said landings and having a load-transporting run extending between said landings and a return run, said structure including track members forming supports for said pallets substantially throughout the length between said landings of the load-transporting run, motive means for moving said load-transporting run and said return run in synchronism with each other in load-transporting and return directions respectively, characterized in that when said conveyor is in operating condition said structure establishes an endless path for said belt which extends along said track members for said load-transporting run and which has an air portion extending clear of said structure between adjacent ends of the load-transporting run and the return run, each of the hinge axes when in said air portion being free to move in any direction transverse to such hinge axis relative to the structure in response to changes in position of the associated two pallets hinged along such axis when said conveyor is in operating condition, said structure including track members forming supports for said pallets on the return run, each of said pallets having wheel means for guiding said pallets along the track members, the wheel means of each of said pallets being clear of all parts of said structure during substantial movement of the associated pallet through said air space, said track members and pallets being so dimensioned that when one of said wheel means is in said air space the two nearest wheel means are respectively in engagement with said track members for the load-transporting run and said track members for the return run.

2. A conveyor for carrying a load, comprising a structure having first and second spaced landings between which load is to be conveyed, an articulated belt comprising an endless series of pallets hinged together on axes normal to the line between said landings and having a load-transporting run extending between said landings and a return run, said structure including track members forming supports for said pallets substantially throughout the length between said landings of the load-transporting run, motive means for moving said load-transporting run and said return run in synchronism with each other in load-transporting and return directions respectively, characterized in that when said conveyor is in operating condition said structure establishes an endless path for said belt which extends along said track members for said load-transporting run and which has an air portion extending clear of said structure between adjacent ends of the load-transporting run and the return run, each of the hinge axes when in said air portion being free to move in any direction transverse to such hinge axis relative to the structure in response to changes in position of the associated two pallets hinged along such axis when said conveyor is in operating condition, said belt having separate axle means parallel to and adjacent each of the hinge axes between pairs of said pallets, said track members guiding each of said axle means along said load-transporting run, each of the axle means while in the space between the load-transporting run and the return run being supported only through the two pallets adjacent thereto, each of said axle means while in said space being free to move relative to the structure in any direction transverse to the axis of such axle means in response to variations in position of the associated two pallets which support such axle means.

3. A conveyor as claimed in claim 2 wherein said motive means comprises rack teeth on each said pallet, a flexible endless belt having teeth and supported to follow a path having one section in which the belt teeth engage the rack teeth on each of said pallets which reaches a predetermined position on said load-transporting run and another section in which the belt teeth engage the rack teeth on each of said pallets which reaches a predetermined position on said return run, and means meshing with the toothed belt to drive said articulated belt around its desired path.

4. A conveyor as claimed in claim 2 wherein said motive means comprises rack teeth on each said pallet, first and second flexible endless belts spaced in the direction of load transportation, each of said first and second flexible belts having teeth and being supported to follow a path having one section in which the belt teeth engage the rack teeth on each of said pallets which reaches a predetermined position on said load-transporting run and another section in which the belt teeth engage the rack teeth on each of said pallets which reaches a predetermined position on said return run, and means meshing with one of said toothed belts to drive said articulated belt around its desired path.

References Cited

UNITED STATES PATENTS

| | | | |
|---|---|---|---|
| 1,043,542 | 11/1912 | Seeberger | 198—18 |
| 1,153,845 | 9/1915 | Henneuse | 198—208 |
| 1,529,635 | 3/1925 | Newhouse | 198—18 |
| 1,682,014 | 8/1928 | Margles et al. | |
| 1,956,153 | 4/1934 | Lindquist et al. | 198—16 |
| 1,956,154 | 4/1934 | Lindquist et al. | 198—16 |
| 2,940,578 | 6/1960 | Clemetsen et al. | 198—16 |
| 3,191,743 | 6/1965 | Rissler et al. | 198—16 |

FOREIGN PATENTS 1,196,764  5/1959  France.

EVON C. BLUNK, *Primary Examiner.*

SAMUEL F. COLEMAN, *Examiner.*

R. J. HICKEY, *Assistant Examiner.*